(12) United States Patent
Yamaguchi et al.

(10) Patent No.: US 7,229,718 B2
(45) Date of Patent: Jun. 12, 2007

(54) ELECTROLYTE FOR RECHARGEABLE LITHIUM BATTERY AND RECHARGEABLE LITHIUM BATTERY COMPRISING SAME

(75) Inventors: Takitaro Yamaguchi, Yokohama (JP); Ryuichi Shimizu, Yokohama (JP); Cheol-Soo Jung, Ohsan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 599 days.

(21) Appl. No.: 10/440,220

(22) Filed: May 15, 2003

(65) Prior Publication Data

US 2004/0038133 A1   Feb. 26, 2004

(30) Foreign Application Priority Data

Aug. 22, 2002  (JP) .............................. 2002-242299
Jan. 21, 2003  (KR) ...................... 10-2003-0003968

(51) Int. Cl.
*H01M 10/40*   (2006.01)

(52) U.S. Cl. ...................... 429/326; 429/200; 429/329; 429/330; 252/62.2

(58) Field of Classification Search ............... None
See application file for complete search history.

(56) References Cited

U.S. PATENT DOCUMENTS 5,795,677 A  *  8/1998  Yamamoto et al. ......... 429/199

FOREIGN PATENT DOCUMENTS

| CN | 1287695 A | 3/2001 |
|----|-----------|--------|
| EP | 1 039 570 A1 | 9/2000 |
| JP | 9-97627 | 4/1997 |
| JP | 2001-210367 | * 8/2001 |

OTHER PUBLICATIONS

Patent Abstract of Japan for Publication No. 09-097627, publication date Apr. 8, 1997, in the name of Yamamoto Taketsugu et al.

* cited by examiner

*Primary Examiner*—Jonathan Crepeau
(74) *Attorney, Agent, or Firm*—Christie, Parker & Hale, LLP

(57) ABSTRACT

Disclosed is an electrolyte for a rechargeable lithium battery including 5 to 40 volume % of at least one fluorine-substituted ether compound represented by R1—O—R2 (wherein R1 and R2 are alkyl groups substituted with fluorine), having a substitution ratio of hydrogen with fluorine of 57 to 86%, a viscosity of 0.9 to 2.3 cp, and a boiling point of at least 88° C., and 60 to 90 volume % of a non-aqueous organic solvent having a flash point of at least 80° C.

26 Claims, 1 Drawing Sheet

ELECTROLYTE FOR RECHARGEABLE LITHIUM BATTERY AND RECHARGEABLE LITHIUM BATTERY COMPRISING SAME

CROSS REFERENCE TO RELATED APPLICATION

This application claims priority of Japanese Application No. 2002-242299 filed in the Japanese Patent Office on Aug. 22, 2002, and Korean Application No. 2003-3968, filed in the Korean Intellectual Property Office on Jan. 21, 2003, the disclosures of which are incorporated herein by reference.

FIELD OF THE INVENTION

The present invention relates to an electrolyte for a rechargeable lithium battery and a rechargeable lithium battery, and more particularly, to an electrolyte for a rechargeable lithium battery with good safety.

BACKGROUND

The conventional organic solvents used in electrolytes for rechargeable lithium batteries include cyclic esters such as ethylene carbonate and propylene carbonate; chain esters such as dimethyl carbonate and propionic ether; and cyclic ethers such as tetrahydrofurane. However, the conventional organic solvents easily decompose during oxidation and reduction of the battery, or they exhibit poor cycle life characteristics.

Recently, attempts have been made to add organic fluorine-included ethers to the organic solvents in electrolytes, which do not decompose during oxidation and reduction of the battery. The organic fluorine-included ethers have a high fluorine content which results in improved stability during the decomposition, but they are not very compatible with other organic solvents used in the electrolyte.

SUMMARY OF THE INVENTION

In one embodiment, the invention is directed to an electrolyte for a rechargeable lithium battery comprising 5 to 40 volume % of at least one fluorine-substituted ether compound represented by $R_1$—O—$R_2$, wherein $R_1$ and $R_2$ are alkyl groups substituted with fluorine, having a substitution ratio of hydrogen with fluorine of 57 to 86%, a viscosity of 0.9 to 2.3 cp, and a boiling point of at least 88° C.; and 60 to 90 volume % of a non-aqueous organic solvent having a flash point of at least 80° C.

In another embodiment, the electrolyte includes 5 to 40 volume % of the fluorine-substituted ether compounds; a high flash point non-aqueous organic solvent in an amount ranging from 20 volume % to 95 volume %; and a low-viscosity non-aqueous organic solvent with a viscosity of 0.2 to 1.8 cP in a positive amount up to 40 volume %.

The fluorine-substituted ether compounds have high compatibility with other solvents, and do not decompose during oxidation and reduction of the battery. In addition, the fluorine-substituted ether compounds increase lithium ionic conductivity at low temperatures.

The fluorine-substituted ether compound is preferably at least one selected from the group consisting of compounds of formulas 1 to 8:

$HCF_2(CF_2)_3CH_2OCF_2CF_2H$  (1)

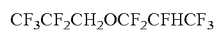 (2)

$HCF_2CF_2CH_2OCF_2CF_2H$ (3)

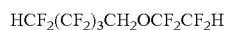 (4)

$HCF_2(CF_2)_3CH_2OCF_2CFHCF_3$ (5)

$HCF_2CF_2OCH_2CF_3$ (6)

$CF_3CF_2CH_2OCF_2CF_2H$ and (7)

$HCF_2CF_2CH_2OCF_2H$ (8).

The present invention is also directed to a rechargeable lithium battery including the electrolyte, a positive electrode including a positive active material in which lithium intercalation reversibly occurs, and a negative electrode including a negative active material in which lithium intercalation reversibly occurs. The rechargeable lithium battery is safe and exhibits good discharge characteristics at low temperatures.

BRIEF DESCRIPTION OF THE DRAWINGS

The accompanying drawings, which are incorporated in and constitute a part of the specification, illustrate an embodiment of the invention, and, together with the description, serve to explain, the principles of the invention.

DETAILED DESCRIPTION OF THE INVENTION

In an exemplary embodiment the rechargeable lithium battery of the present invention includes a positive electrode, a negative electrode, and an electrolyte, and it is a lithium ion battery or a lithium ion polymer battery.

The positive electrode includes, for example, a material formed by mixing a positive active material and a binder such as polyvinylidene fluoride, and a conductive agent such as carbon black, and shaping it into a sheet or a circle form. Examples of the positive active material include at least one lithiated intercalation compound including lithium, and at least one selected from the group consisting of cobalt, manganese, and nickel, such as $LiMn_2O_4$, $LiCoO_2$, $LiNiO_2$, $LiFeO_2$, or $V_2O_5$. It further comprises a compound such as TiS, MoS, an organic disulfide compound, or an organic polysulfide compound, which are capable of reversible intercalation and deintercalation of lithium ions.

The negative electrode includes, for example, a material formed by mixing a negative active material powder and a binder such as polyvinylidene fluoride, and optionally a conductive agent such as carbon black, and shaping it into a plane circle. Examples of the negative active material include a carbonaceous material such as artificial graphite, natural graphite, carbon fiber graphite, graphite meso carbon microbeads, and amorphous carbon; a metal capable of alloying with lithium; and any mixture including the metal and carbonaceous material. Metals capable of alloying with lithium include Al, Si, Sn, Pb, Zn, Bi, In, Mg, Ga, and Cd.

Further, a metal lithium foil may also be used as a negative electrode.

Figure 1:
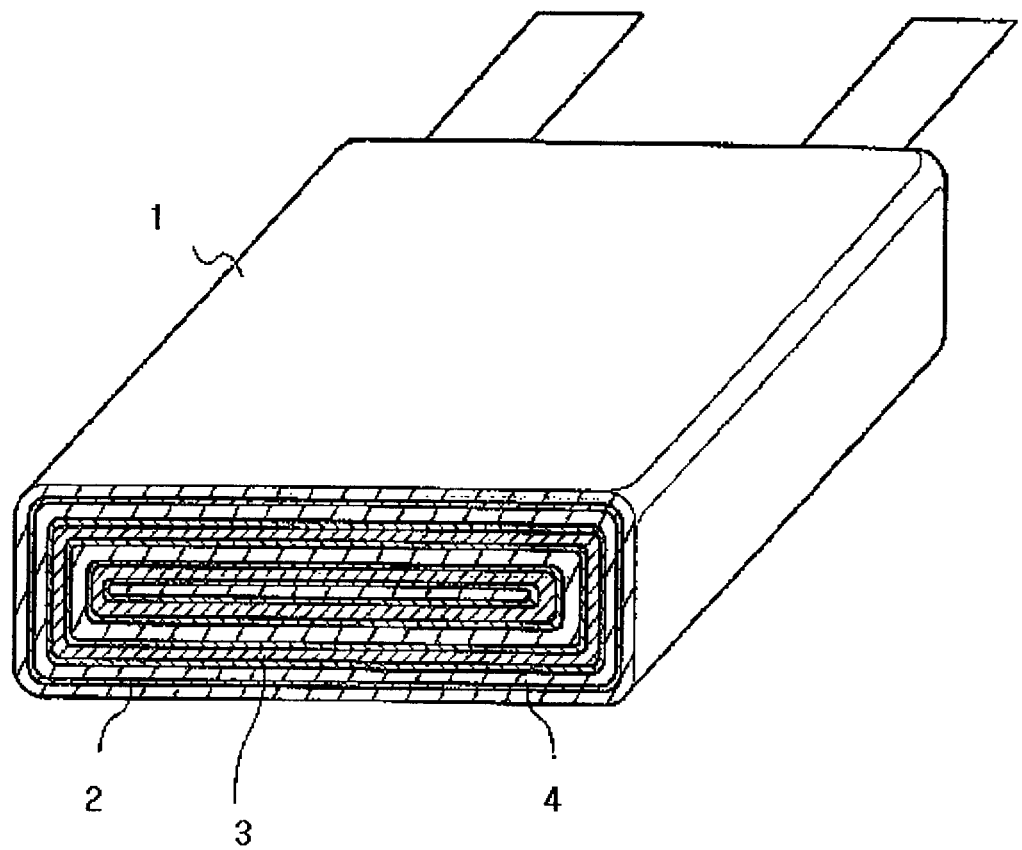
FIG. 1 shows a rechargeable lithium battery according to an embodiment of the present invention.

A rechargeable lithium battery of the present invention includes a positive electrode 3 and a negative electrode 4 capable of intercalating and deintercalating lithium, and an electrolyte. The positive electrode 3, negative electrode 4, and electrolyte, along with a separator 2, are put into a case 1 to fabricate a rechargeable lithium cell, as shown in FIG. 1.

The electrolyte of the present invention includes 5 to 40 volume % of at least one fluorine-substituted ether compound. The fluorine-substituted ether compound is represented by $R_1$—O—$R_2$, wherein $R_1$ and $R_2$ are alkyl groups substituted with fluorine, and has a substitution ratio of $R_1$ and $R_2$ groups of 57 to 86%. In one embodiment the fluorine-substituted ether compound has a viscosity of 0.9 to 2.3 cp and a boiling point of at least of 88° C.

In another embodiment, the electrolyte includes 60 to 95 volume % of a high flash point organic solvent with a flash point of at least of 80° C., or alternatively it includes the high flash point organic solvent in an amount ranging from 20 volume % to 95 volume %, and a low-viscosity non-aqueous solvent with a viscosity of 0.2 to 1.8 cP in a positive amount up to 40 volume %.

The electrolyte can further include a compatibilizer in order to improve compatibility between the fluorine-substituted ether compound and the non-aqueous solvent.

The electrolyte of the present invention includes at least one, and preferably at least two, fluorine-substituted ether compounds represented by $R_1$—O—$R_2$, wherein $R_1$ and $R_2$ are alkyl groups substituted with fluorine, and having a substitution ratio of hydrogen with fluorine in the $R_1$ and $R_2$ groups (hereinafter, referred to as the "fluorine ratio") of 57 to 86%. The fluorine-substituted ether compound has a viscosity of 0.9 to 2.3 cP, a boiling point of at least 88° C., and no flash point.

If the fluorine ratio is less than 57%, the electrolyte can easily decompose during oxidation and reduction of the battery, thereby causing ignition under severe conditions. If the fluorine ratio is more than 86%, lithium salts are not dissolved in the solvent, and the compatibility between the fluorine-substituted ether compound and the non-aqueous solvent is reduced. As used herein, the "fluorine ratio" indicates a proportion of hydrogen substitution with fluorine in the $R_1$ or $R_2$ alkyl groups. For example, an $HCF_2(CF_2)_3CH_2$ group has a fluorine ratio of 73% in which eight (8) of the eleven (11) total hydrogen groups are substituted with fluorine groups.

The viscosity of 0.9 to 2.3 cP allows an increase in lithium ionic conductivity at low temperatures. If the viscosity is less than 0.9 cP, the intermolecular force decreases in the fluorine-substituted ether compound so that it easily evaporates, thereby reducing the boiling point to less than 88° C. If the viscosity is more than 2.3 cp, the intermolecular force increases and the boiling point increases at low temperatures so that it is difficult to transfer lithium ions, and conductivity decreases.

More preferably, the viscosity is 0.9 to 2.0 cP. If a mixture of at least two of the fluorine-substituted ether compounds is used, the viscosity of each compound need not be limited to 0.9 to 2.3 cP, and preferably 0.9 to 2.0 cP, but rather it is sufficient to have the total viscosity of the whole mixture at 0.9 to 2.3 cP, and preferably 0.9 to 2.0 cP.

If the boiling point of the fluorine-substituted ether compound is less than 88° C., the compound evaporates and unwanted problems may occur. With a high boiling point, unwanted problems rarely occur. However, too high a boiling point causes an increase in viscosity to substantially more than 2.3 cP.

The fluorine-substituted ether compound preferably has no flash point according to the flash point test of the Japanese Industrial Standard (JIS)-K-2265, the disclosure of which is incorporated herein by reference. If the compound has a flash point, ignition of the electrolyte may occur under severe conditions.

Examples of the fluorine-substituted ether compound are represented by formulas 1 to 8:

  (1)

  (2)

  (3)

  (4)

  (5)

  (6)

  (7)

  (8).

The high-flash point organic solvent with a flash point of at least 80° C., and preferably 80 to 180° C., has a high dielectric constant that allows easy dissolution and dissociation of lithium salts, increasing lithium ionic conductivity. In addition, the fluorine-substituted ether compound having no flash point can prevent heat explosion or explosion of the battery under severe conditions.

The high-flash point organic solvent may include one or more cyclic esters and/or one or more cyclic carbonate. Examples thereof include cyclic esters such as butyrolactone, decanolide, valerolactone, and mevalonolactone; and cyclic carbonates such as ethylene carbonate, fluoroethylene carbonate, chloroethylene carbonate, propylene carbonate, chloromethylethylene carbonate, and fluoromethylethylene carbonate.

If a mixture of organic solvents is used, the mixing ratio can be suitably controlled as is well understood in the related art.

The physical properties of the fluorine-substituted ether compound, the high-flash organic solvent and the low-viscosity organic solvent are shown in Table 1.

TABLE 1

|  | Viscosity at 25° C. | Boiling point (° C.) | Flash point (° C.) | Fluorine ratio of $R_1$ | Fluorine ratio of $R_2$ |
|---|---|---|---|---|---|
| Diethylcarbonate | 0.8 | 127 | 31 | 0 | 0 |
| Dimethylcarbonate | 0.6 | 90 | 18 | 0 | 0 |
| Ethylene carbonate | Solid | 238 | 160 | 0 | 0 |
| Propylene carbonate | 3.0 | 242 | 132 | 0 | 0 |
| γ-butyrolactone | 1.8 | 202 | 98 | 0 | 0 |
| Formula 1 | 2.2 | 145 | No | 73 | 80 |
| Formula 2 | 0.9 | 88 | No | 71 | 86 |
| Formula 3 | 1.2 | 92 | No | 57 | 80 |
| Formula 4 | 1.3 | 105 | No | 57 | 86 |

TABLE 1-continued

|  | Viscosity at 25° C. | Boiling point (° C.) | Flash point (° C.) | Fluorine ratio of $R_1$ | Fluorine ratio of $R_2$ |
|---|---|---|---|---|---|
| Formula 5 | 2.2 | 146 | No | 73 | 86 |
| Formula 6 | 1.2 | 96 | No | 80 | 60 |
| Formula 7 | 1.1 | 93 | No | 71 | 80 |
| Formula 8 | 0.8 | 82 | No | 57 | 66 |

As shown in Table 1, the fluorine-substituted ether compound has no flash point. In addition, the cyclic carbonates, such as ethylene carbonate and propylene carbonate, and the cyclic ester such as γ-butyrolactone, which are used together with the flourine-substituted compound of the present invention, have a flash point of at least 80° C.

The amount of the fluorine-substituted ether compound is preferably 5 to 40 volume %, and more preferably 10 to 30 volume %. The amount of the high flash point organic solvent is preferably 60 to 95 volume %, and more preferably 70 to 90 volume %. Alternatively, if the low-viscosity organic solvent and the high flash point organic solvent are used together, the amount of the high-flash point organic solvent preferably ranges from 20 volume % to 95 volume %; and that of the low-viscosity organic solvent is preferably up to 40 volume %. If the amount of the high flash point organic solvent is outside this range, the fabricated battery may exhibit unwanted performance. Furthermore, if the high flash point organic solvent is not used, and the low viscosity organic solvent and the fluorine-substituted ether compound are used, a flame-retardant electrolyte of the present invention cannot be produced.

If the amount of the fluorine-substituted ether compound is less than 5 volume %, the viscosity increases, thereby decreasing lithium ionic conductivity and decreasing resistance to oxidation. If the amount of the fluorine-substituted ether compound is more than 40 volume %, the dissolution of the lithium salt decreases and it does not work as an electrolyte. If a mixture of at least two fluorine-substituted compounds is used, the mixing ratio can be suitably controlled.

The electrolyte further preferably includes a compatibilizer represented by formulas 9 to 13:

$$HCF_2CF_2CH_2OCH_2CH_2OCH_3 \quad (9)$$

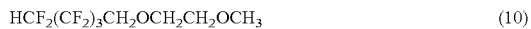
$$HCF_2(CF_2)_3CH_2OCH_2CH_2OCH_3 \quad (10)$$

$$CH_3COOCH_2(CF_2)_3CF_2H \quad (11)$$

$$CH_3COOCH_2CF_2CF_2H \text{ and} \quad (12)$$

$$CH_3(CH_2)_4COOCH_3 \quad (13).$$

The compatibilizer has a functional group that is capable of coordinating with lithium ions, and one or more alkyl groups; and more preferably, a functional group that is capable of coordinating with lithium ions, and an alkyl group substituted with fluorine. Thus, it is believed that the compatibilizer has compatibility with the fluorine-substituted ether compound and the non-aqueous solvent coordinated with lithium. The compatibilizer helps to improve the compatibility between the fluorine-substituted ether compound and the non-aqueous solvent over a broad temperature range, and helps to enhance lithium ionic conductivity at low temperatures.

The compatibilizer is preferably present in the electrolyte in an amount ranging from 0.01 to 10 wt %, and more preferably from 0.1 to 3 wt %.

If the amount of the compatibilizer is less than 0.01 wt %, the fluorine-substituted ether compound and the non-aqueous solvent separate. If the amount of the compatibilizer is more than 10 wt %, the flammability increases, causing ignition under severe conditions.

The lithium salt may be $LiPF_6$, $LiBF_4$, $Li[N(SO_2C_2F_6)_2]$, $Li[B(OCOCF_3)_4]$, or $Li[B(OCOC_2F_5)_4]$, and preferably $LiPF_5$, a BETI salt ($Li[N(SO_2C_2F_5)_2]$) or a mixture thereof. More preferred is the BETI salt, which is well-dissolved in the fluorine-substitution ether compound. The concentration of the lithium salt is preferably 0.5 to 2.0M/L.

The electrolyte of the present invention is applied to rechargeable lithium batteries, e.g., lithium ion batteries or lithium polymer batteries. If the electrolyte is used in a lithium ion battery, the electrolyte is present in the form of a solution, and if it is used in a lithium polymer battery, the electrolyte is presented in the form of a gel polymer. The gel polymer is prepared by adding a polymerization initiator to the solution form of the electrolyte, and immersing the resulting material into a polymer matrix, followed by gel-polymerization. This process is well known and easily understood by one of ordinary skill in the art The polymer matrix may be an acryloyl-substituted polyethyleneoxide; an acryloyl-substituted polypropyleneoxide or polyacrylonitrile; or an acryloyl-substituted polyurethane, polyacrylate, or polyethyleneglycol diacrylate. Alternatively, the polymer matrix may be a cross-linked polymer with ethyl oxide groups as main chains or side chains. The polymerization initiator may be an azo compound or peroxide, and examples thereof are lauroyl peroxide and benzoyl peroxide.

The electrolyte of the present invention has good compatibility and does not decompose during oxidation and reduction. The electrolyte can provide safe rechargeable lithium batteries exhibiting good discharge characteristics at low temperatures.

The following examples illustrate the present invention in further detail, but it is understood that the present invention is not limited by these examples.

EXAMPLES 1 TO 18 AND COMPARATIVE EXAMPLES 1 TO 14

Electrolytes having compositions as shown in Tables 2 and 3 according to Examples 1 to 18 and Comparative Examples 1 to 14 were prepared by using a fluorine-substituted ether compound and a non-aqueous organic solvent as an electrolyte solvent; $LiPF_6$, BETI (manufactured by 3M), or a mixture thereof as an electrolytic salt; and optionally a compatibilizer. In Tables 2 and 3, an electrolyte according to Example 18 was produced by gel-polymerizing the electrolyte according to Example 14 using a monomer and a polymerization initiator. As the monomer, polyethyleneglycol diacrylate (molecular weight: 258) was used in the amount of 5 wt % based on the electrolyte according to Example 14, and as the initiator, lauroyl peroxide was used in the amount of 1 wt % based on the monomer. Using the electrolyte according to Example 18, a lithium polymer cell was assembled by heating at 70° C. for 3 hours.

Table 2 indicates the composition of the electrolyte, and Table 3 indicates the amount of the lithium salt. In Table 2, EC indicates ethylene carbonate, PC indicates propylene carbonate, and BL indicates γ-butyrolactone.

TABLE 2

| | Non-aqueous organic solvent | Volume % | F-based flame retardant solvent | Volume % |
|---|---|---|---|---|
| Comparative Example 1 | EC:DEC (30:70) | 100 | — | |
| Comparative Example 2 | EC | 50 | $HCF_2CF_2CH_2OCF_2CF_2H$ | 50 |
| Comparative Example 3 | EC | 50 | $HCF_2CF_2CH_2OCF_2CFHCF_3$ | 50 |
| Comparative Example 4 | EC | 50 | $CF_3CF_2CH_2OCF_2CFHCF_3:HCF_2CF_2CH_2OCF_2CFHCF_3$ (25:25) | 50 |
| Comparative Example 5 | EC | 50 | $HCF_2CF_2CH_2OCF_2CFHCF_3:HCF_2(CF_2)_3CH_2OCF_2CF_2H$ (25:25) | 50 |
| Comparative Example 6 | EC | 50 | $CF_3CF_2CH_2OCF_2CFHCF_3:HCF_2(CF_2)_3CH_2OCF_2CF_2H$ (25:25) | 50 |
| Comparative Example 7 | EC | 80 | $CF_3(CF_2)_3OCH_3$ | 20 |
| Example 1 | EC | 80 | $HCF_2(CF_2)_3CH_2OCF_2CF_2H$ | 20 |
| Example 2 | EC | 80 | $HCF_2CF_2CH_2OCF_2CFHCF_3$ | 20 |
| Comparative Example 8 | EC:PC(40:10) | 50 | $HCF_2CF_2CH_2OCF_2CF_2H$ | 50 |
| Comparative Example 9 | EC:BL(30:20) | 50 | $HCF_2CF_2CH_2OCF_2CFHCF_3$ | 50 |
| Comparative Example 10 | EC:BL(30:20) | 50 | $HCF_2CF_2CH_2OCF_2CFHCF_3:HCF_2(CF_2)_3CH_2OCF_2CF_2H$ (25:25) | 50 |
| Comparative Example 11 | EC:BL(30:20) | 50 | $CF_3CF_2CH_2OCF_2CFHCF_3:HCF_2(CF_2)_3CH_2OCF_2CF_2H$ (25:25) | 50 |
| Example 3 | EC:PC(60:20) | 80 | $HCF_2CF_2CH_2OCF_2CF_2H$ | 20 |
| Example 4 | EC:PC(60:20) | 80 | $HCF_2CF_2CH_2OCF_2CF_2H$ | 20 |
| Example 5 | EC:BL(50:30) | 80 | $HCF_2CF_2CH_2OCF_2CFHCF_3$ | 20 |
| Example 6 | EC:PC(60:20) | 80 | $HCF_2CF_2CH_2OCF_2CF_2H$ | 20 |
| Example 7 | EC:PC(50:30) | 80 | $HCF_2CF_2CH_2OCF_2CFHCF_3$ | 20 |
| Example 8 | EC:BL(50:50) | 80 | $HCF_2CF_2CH_2OCF_2CF_2H$ | 20 |
| Comparative Example 12 | EC:PC:BL(30:10:60) | 50 | $HCF_2CF_2CH_2OCF_2CF_2H$ | 50 |
| Example 9 | EC:PC:BL(30:10:60) | 60 | $HCF_2CF_2CH_2OCF_2CF_2H$ | 40 |
| Example 10 | EC:PC:BL(60:10:30) | 70 | $HCF_2CF_2CH_2OCF_2CFHCF_3$ | 30 |
| Example 11 | EC:PC:BL(60:10:30) | 70 | $CF_3CF_2CH_2OCF_2CFHCF_3:HCF_2(CF_2)_3CH_2OCF_2CF_2H$ (25:25) | 30 |
| Example 12 | EC:PC:BL(30:10:60) | 70 | $HCF_2CF_2CH_2OCF_2CF_2H$ | 30 |
| Example 13 | EC:PC:BL(60:10:30) | 80 | $HCF_2CF_2CH_2OCF_2CF_2H$ | 20 |
| Example 14 | EC:PC:BL(30:10:60) | 80 | $HCF_2CF_2CH_2OCF_2CF_2H$ | 20 |
| Example 15 | EC:PC:BL(30:10:60) | 90 | $HCF_2CF_2CH_2OCF_2CF_2H$ | 10 |
| Comparative Example 13 | EC:PC:BL(30:10:60) | 100 | $HCF_2CF_2CH_2OCF_2CF_2H$ | 0 |
| Example 16 | EC:DEC:BL(45:10:45) | 80 | $HCF_2CF_2CH_2OCF_2CF_2H$ | 20 |
| Example 17 | EC:DEC:BL(30:40:30) | 80 | $HCF_2CF_2CH_2OCF_2CF_2H$ | 20 |
| Comparative Example 14 | EC:DEC:BL(15:70:15) | 80 | $HCF_2CF_2CH_2OCF_2CF_2H$ | 20 |
| Example 18 | EC:DEC:BL(30:40:30) | 80 | $HCF_2CF_2CH_2OCF_2CF_2H$ | 20 |

TABLE 3

| | $LiPF_6$ | M % | BETI | M % | Compatibilizer | Wt % |
|---|---|---|---|---|---|---|
| Comparative Example 1 | 1.3 M | 100 | 0 M | 0 | — | 0 |
| Comparative Example 2 | 0.2 M | 20 | 0.8 M | 80 | — | 0 |
| Comparative Example 3 | 0.2 M | 20 | 0.8 M | 80 | — | 0 |
| Comparative Example 4 | 0.2 M | 20 | 0.8 M | 80 | — | 0 |
| Comparative Example 5 | 0.2 M | 20 | 0.8 M | 80 | — | 0 |
| Comparative Example 6 | 0.2 M | 20 | 0.8 M | 80 | — | 0 |
| Comparative Example 7 | 1 M | 100 | 0 M | 0 | — | 0 |
| Example 1 | 1 M | 100 | 0 M | 0 | — | 0 |
| Example 2 | 1 M | 100 | 0 M | 0 | — | 0 |
| Comparative Example 8 | 0.2 M | 20 | 0.8 M | 80 | — | 0 |
| Comparative Example 9 | 0.1 M | 10 | 0.9 M | 90 | $HCF_2CF_2CH_2OCH_2CH_2OCH_3$ | 0.5 |
| Comparative Example 10 | 0.1 M | 10 | 0.9 M | 90 | $HCF_2(CF_2)_3CH_2OCH_2CH_2OCH_3$ | 0.5 |

TABLE 3-continued

|  | LiPF$_6$ | M % | BETI | M % | Compatibilizer | Wt % |
|---|---|---|---|---|---|---|
| Comparative Example 11 | 0.1 M | 10 | 0.9 M | 90 | CH$_3$COOCH$_2$(CF$_2$)$_3$CF$_2$H | 0.5 |
| Example 3 | 1 M | 100 | 0 M | 0 | CH$_3$(CH$_2$)$_4$COOCH$_3$ | 1 |
| Example 4 | 1 M | 100 | 0 M | 0 | CH$_3$(CH$_2$)$_4$COOCH$_3$ | 3 |
| Example 5 | 1 M | 100 | 0 M | 0 | — | 0 |
| Example 6 | 1 M | 100 | 0 M | 0 | — | 0 |
| Example 7 | 1 M | 100 | 0 M | 0 | — | 0 |
| Example 8 | 1 M | 100 | 0 M | 0 | — | 0 |
| Comparative Example 12 | 1 M | 100 | 0 M | 0 | — | 0 |
| Example 9 | 1 M | 100 | 0 M | 0 | — | 0 |
| Example 10 | 1 M | 100 | 0 M | 0 | CH$_3$COOCH$_2$CH$_2$CF$_2$H | 0.5 |
| Example 11 | 1 M | 100 | 0 M | 0 | HCF$_2$(CF$_2$)$_2$CH$_2$OCH$_2$CH$_2$CH$_3$ | 0.5 |
| Example 12 | 1 M | 100 | 0 M | 0 | — | 0 |
| Example 13 | 0.8 M | 80 | 0.2 M | 20 | — | 0 |
| Example 14 | 1 M | 100 | 0 M | 0 | — | 0 |
| Example 15 | 1 M | 100 | 0 M | 0 | — | 0 |
| Comparative Example 13 | 1 M | 100 | 0 M | 0 | — | 0 |
| Example 16 | 1 M | 100 | 0 M | 0 | — | 0 |
| Example 17 | 1 M | 100 | 0 M | 0 | — | 0 |
| Comparative Example 14 | 1 M | 100 | 0 M | 0 | — | 0 |
| Example 18 | 1 M | 100 | 0 M | 0 | Polyethyelenperoxide and lauroylperoxide | 3.0 |

The lithium ionic conductivity of the electrolytes according to Examples 3 to 18 and Comparative Examples 1 to 6 and 9 to 14 was measured at −20° C., and the results are shown in Table 4.

As shown in Table 4, all fluorine-substituted ether compounds (whether one or two) used in Examples 3 to 18 had a total viscosity of 1.2 to 1.4 cP. The viscosity of the compound used in Example 1 was 2.2 cP.

If a mixture of the fluorine-substituted ether compound is used, the viscosity of the mixture should be 2.3 cp or less. Thus, all compounds of the mixture need not have a viscosity of 2.3 cp or less, but a compound having a viscosity substantially greater than 2.3 cp cannot be used because the viscosity of the mixture is approximately an average value of all compounds.

It can be seen in Table 4 that the electrolytes according to Examples 3 to 18 and Comparative Examples 1 to 6 and 9 to 14 have ionic conductivity of 0.8 to 1.7 mS/cm at −20° C. The electrolyte according to Example 1 has an ionic conductivity of 0.0 mS/cm. This is considered to result because the electrolyte according to Example 1 has a higher content of ethylene carbonate (80 volume %), causing it to freeze at −20° C.

TABLE 4

|  | Viscosity of the fluorine-substituted compound | Conductivity at low temperature (−20° C.) | Capacity retention at low temperature (−20° C.) |
|---|---|---|---|
| Comparative Example 1 | 1.1 cp | 2.2 mS/cm | 91.3% |
| Comparative Example 2 | 1.5 cp | 1.1 mS/cm | 48.1% |
| Comparative Example 3 | 1.5 cp | 1.1 mS/cm | 47.1% |
| Comparative Example 4 | 1.5 cp | 1.1 mS/cm | 48.4% |
| Comparative Example 5 | 1.5 cp | 1.1 mS/cm | 47.3% |
| Comparative Example 6 | 1.5 cp | 1.1 mS/cm | 44.3% |
| Comparative Example 9 | 1.3 cp | 1.1 mS/cm | 82.0% |
| Comparative Example 10 | 1.4 cp | 1.1 mS/cm | 82.4% |
| Comparative Example 11 | 1.4 cp | 1.1 mS/cm | 83.4% |
| Example 3 | 1.3 cp | 1.1 mS/cm | 78.5% |
| Example 4 | 1.3 cp | 1.2 mS/cm | 77.7% |
| Example 5 | 1.3 cp | 1.7 mS/cm | 86.3% |
| Example 6 | 1.2 cp | 1.0 mS/cm | 61.8% |
| Example 7 | 1.3 cp | 10 mS/cm | 60.5% |
| Example 8 | 1.2 cp | 10 mS/cm | 88.3% |
| Comparative Example 12 | 1.0 cp | 1.2 mS/cm | 89.3% |
| Example 9 | 1.0 cp | 0.8 mS/cm | 88.1% |
| Example 10 | 1.3 cp | 1.6 mS/cm | 87.1% |

TABLE 4-continued

|  | Viscosity of the fluorine-substituted compound | Conductivity at low temperature (−20° C.) | Capacity retention at low temperature (−20° C.) |
|---|---|---|---|
| Example 11 | 1.4 cp | 1.6 mS/cm | 80.3% |
| Example 12 | 1.1 cp | 0.9 mS/cm | 86.5% |
| Example 13 | 1.3 cp | 1.4 mS/cm | 89.0% |
| Example 14 | 1.1 cp | 10 mS/cm | 87.2% |
| Example 15 | 1.2 cp | 1.1 mS/cm | 85.3% |
| Comparative Example 13 | 1.4 cp | 1.1 mS/cm | 85.8% |
| Example 16 | 1.2 cp | 10 mS/cm | 88.5% |
| Example 17 | 1.1 cp | 10 mS/cm | 89.6% |
| Comparative Example 14 | 0.9 cp | 1.0 mS/cm | 90.2% |
| Example 18 | 1.1 cp | 0.9 mS/cm | 85.3% |

The fluorine ratio of the fluorine-substituted ether compound, the flash point, and ability to dissolve at −20° C. to room temperature of electrolytes according to Examples 2 to 18 and Comparative Examples 2 to 7, 9 to 12 and 14 were measured, and the results are shown in Table 5. The flash point was determined by a flash point test under JIS-K2265 criteria. The ability to dissolve was determined by mixing an electrolytic solvent and a lithium salt at 40° C. for 8 hours to prepare an electrolyte, and allowing it to stand, followed by a visual uniformity evaluation. In Table 5, the two fluorine ratio disclosed in column 2 indicates that two fluorine-substituted ether compounds were used. The first value of fluorine ratio is the first compound shown in Table 2, and the second value is the second compound. The term "r.t" means "room temperature" in Table 5.

As shown in Table 5, the fluorine-substitution ether compounds according to Examples 2 to 18 had fluorine ratios of 57 to 86%. It is shown that all the fluorine-substituted ether compounds had no flash point. In addition, the compounds were uniformly dissolved in the solvent at −20° C. to room temperature. However, in the electrolyte according to Comparative Example 7, phase separation was observed. This result is believed to have occured because the high fluorine ratio of 100%, that is, 100% of the $R_1$ group, causes polarity, decreasing compatibility between the fluorine-substituted ether compound and the non-aqueous solvent coordinated with lithium ions.

TABLE 5

|  | Fluorine ratio ($R_1$, $R_2$) | Flash point of the ether compound | Ability to dissolve |
|---|---|---|---|
| Comparative Example 2 | 57%, 80% | No | Dissolve (r.t to −20° C.) |
| Comparative Example 3 | 57%, 86% | No | Dissolve (r.t to −20° C.) |
| Comparative Example 4 | 71%, 86%; 57%, 86% | No | Dissolve (r.t to −20° C.) |
| Comparative Example 5 | 71%, 86%; 73%, 80% | No | Dissolve (r.t to −20° C.) |
| Comparative Example 6 | 71%, 86%; 73%, 86% | No | Dissolve (r.t to −20° C.) |
| Comparative Example 7 | 100%, 0% | No | Phase separation (r.t) |
| Example 2 | 57%, 80% | No | Dissolve (r.t to −20° C.) |
| Comparative Example 9 | 57%, 86% | No | Dissolve (r.t to −20° C.) |
| Comparative Example 10 | 71, 86%; 73%, 80% | No | Dissolve (r.t to −20° C.) |
| Comparative Example 11 | 71, 86%; 73%, 80% | No | Dissolve (r.t to −20° C.) |
| Example 3 | 57%, 80% | No | Dissolve (r.t to −20° C.) |
| Example 4 | 57%, 80% | No | Dissolve (r.t to −20° C.) |
| Example 5 | 57%, 80% | No | Dissolve (r.t to −20° C.) |
| Example 6 | 57%, 80% | No | Dissolve (r.t to −20° C.) |
| Example 7 | 57%, 86% | No | Dissolve (r.t to −20° C.) |
| Example 8 | 57%, 80% | No | Dissolve (r.t to −20° C.) |
| Comparative Example 12 | 57%, 80% | No | Dissolve (r.t to −20° C.) |
| Example 9 | 57%, 80% | No | Dissolve (r.t to −20° C.) |
| Example 10 | 57%, 86% | No | Dissolve (r.t to −20° C.) |
| Example 11 | 71, 86%; 73%, 80% | No | Dissolve (r.t to −20° C.) |
| Example 12 | 57%, 80% | No | Dissolve (r.t to −20° C.) |
| Example 13 | 57%, 80% | No | Dissolve (r.t to −20° C.) |
| Example 14 | 57%, 80% | No | Dissolve (r.t to −20° C.) |
| Example 15 | 57%, 80% | No | Dissolve (r.t to −20° C.) |
| Example 16 | 57%, 80% | No | Dissolve (r.t to −20° C.) |

TABLE 5-continued

|  | Fluorine ratio ($R_1$, $R_2$) | Flash point of the ether compound | Ability to dissolve |
|---|---|---|---|
| Example 17 | 57%, 80% | No | Dissolve (r.t to −20° C.) |
| Comparative Example 14 | 57%, 80% | No | Dissolve (r.t to −20° C.) |
| Example 18 | 57%, 80% | No | Dissolve (r.t to −20° C.) |

The boiling points of the fluorine-substituted ether compound solvents of Examples 2 to 18 and Comparative Examples 2 to 7, 9 to 12 and 14 were measured, and the results are shown in Table 6. In Table 6, two boiling points in one cell indicate the boiling points of the first and second compounds. It can be seen from Table 6 that the fluorine-substituted ether compounds, except for Comparative Example 7, had boiling points of 88 to 150° C.

TABLE 6

|  | Boiling point | Viscosity |
|---|---|---|
| Comparative Example 2 | 92° C. | 1.2 cp |
| Comparative Example 3 | 106° C. | 1.3 cp |
| Comparative Example 4 | 88° C., 106° C. | 1.1 cp (mixture) |
| Comparative Example 5 | 88° C., 145° C. | 1.4 cp (mixture) |
| Comparative Example 6 | 88° C., 150° C. | 1.4 cp (mixture) |
| Comparative Example 7 | 60° C. | 0.7 cp |
| Example 2 | 92° C. | 1.2 cp |
| Comparative Example 9 | 106° C. | 1.3 cp |
| Comparative Example 10 | 88° C., 145° C. | 1.4 cp (mixture) |
| Comparative Example 11 | 88° C., 145° C. | 1.4 cp (mixture) |
| Example 3 | 92° C. | 1.3 cp |
| Example 4 | 92° C. | 1.3 cp |
| Example 5 | 106° C. | 1.3 cp |
| Example 6 | 92° C. | 1.2 cp |
| Example 7 | 106° C. | 1.3 cp |
| Example 8 | 92° C. | 1.3 cp |
| Comparative Example 12 | 92° C. | 1.3 cp |
| Example 9 | 92° C. | 1.3 cp |
| Example 10 | 106° C. | 1.3 cp |
| Example 11 | 88° C., 145° C. | 1.4 cp (mixture) |
| Example 12 | 92° C. | 1.3 cp |
| Example 13 | 92° C. | 1.3 cp |
| Example 14 | 92° C. | 1.3 cp |
| Example 15 | 92° C. | 1.3 cp |
| Example 16 | 92° C. | 1.3 cp |
| Example 17 | 92° C. | 1.3 cp |
| Comparative Example 14 | 92° C. | 1.3 cp |
| Example 18 | 92° C. | 1.3 cp |

Using the electrolytes according to Examples 3 to 18 and Comparitive Examples 1 to 14, rectangular rechargeable lithium cells were fabricated. The rechargeable lithium cells were assembled by winding a positive electrode with a $LiCoO_2$ positive active material and a negative electrode with a carbon fiber to prepare an electrode element, and inserting the element into a case followed by injecting the electrolytes therein. The resulting cells were constant-current and constant-voltage charged at 0.2 C until the voltage reached 4.2V, over 8 hours. The charged cells had a nominal capacity of 660 mAh, a thickness of 4 mm, a width of 30 mm, and a height of 60 mm.

The capacity retention at −20° C. and the proportion of thickness increase of the cells were measured. The capacity retention was determined by dividing discharge capacity for 1 cycle at room temperature by capacity for 2 cycles at −20° C. at a charging current of 0.2 C, a discharge cut-off voltage of 2.75V, a charging current of 0.5 C, and discharge by voltage of 4.2V over 2.5 hours.

The thickness variation was measured by maintaining the cells at 90° C. for 4 hours and by determining thickness with a slide caliper. The results are shown in Table 7.

TABLE 7

|  | Capacity retention at room temperature (−20° C.) | Thickness variation (90° C.) |
|---|---|---|
| Comparative Example 1 | 91.3% | 21.0% |
| Comparative Example 2 | 48.1% | 4.4% |
| Comparative Example 3 | 47.1% | 4.1% |
| Comparative Example 4 | 48.4% | 4.5% |
| Comparative Example 5 | 47.3% | 4.2% |
| Comparative Example 6 | 44.3% | 3.3% |
| Comparative Example 7 | — | 105.9% |
| Comparative Example 8 | 48.8% | 4.6% |
| Comparative Example 9 | 82.0% | 2.6% |
| Comparative Example 10 | 82.4% | 2.7% |
| Comparative Example 11 | 83.4% | 3.0% |
| Example 3 | 78.5% | 4.5% |
| Example 4 | 77.7% | 4.3% |
| Example 5 | 86.3% | 3.9% |
| Example 6 | 61.8% | 2.5% |
| Example 7 | 60.5% | 2.2% |
| Example 8 | 88.3% | 3.0% |
| Comparative Example 12 | 89.3% | 4.2% |
| Example 9 | 88.1% | 3.2% |

TABLE 7-continued

| | Capacity retention at room temperature (−20° C.) | Thickness variation (90° C.) |
|---|---|---|
| Example 10 | 87.1% | 4.1% |
| Example 11 | 80.3% | 2.1% |
| Example 12 | 86.5% | 3.3% |
| Example 13 | 89.0% | 4.7% |
| Example 14 | 87.2% | 2.3% |
| Example 15 | 85.3% | 3.0% |
| Comparative Example 13 | 85.8% | 2.7% |
| Example 16 | 88.5% | 3.0% |
| Example 17 | 89.6% | 3.5% |
| Comparative Example 14 | 90.2% | 15.3% |
| Example 18 | 85.3% | 0.5% |

It can be seen from Table 7 that the cells according to Comparative Examples 2, 6, and 8 had capacity retentions of 44.3 to 48.8%−20° C., but those according to Examples 3 to 18 had capacity retentions of 60.5 to 90.2%.

The cell according to Comparative Example 1 had good capacity retention of 91.3%, but the high thickness variation of 90% causes it to be un-usable. The cell according to Comparative Example 14 had good capacity retention of 90.2%, but the high thickness variation of 15.3% makes it difficult to use. These results are considered to occur because excess diethylene carbonate in Comparative Examples 1 and 14 decreases the boiling point, causing swelling of the cell. The cell according to Comparative Example 7 exhibited a thickness variation of more than 100%, and this result is considered to occur because the fluorine-substituted ether compound with a boiling point of 60° C. evaporates to generate gas. The cells according to Example 3 and 18, however, had a thickness variation of 2.1% and 4.7% respectively. In addition, the gel-polymer electrolyte according to Example 18 can effectively prevent swelling at a high temperature while the solution electrolyte according to Example 17 cannot, even though the two electrolytes have the same composition.

An ignition test and a 3 C overcharging test of the cells according to Examples 3 to 18 and Comparative Examples 1 to 14 were undertaken, and the results are shown in Table 8. The ignition test was performed by lighting the cell for at least 1 second under a flash point test of the JIS-K2265 criteria. The 3 C overcharging test was performed with constant-current and constant-voltage charging the full-charged cell at 3 C by 12V. In the 3 C overcharging test, a maximum temperature was also measured.

TABLE 8

| | Ignition test (up to 180° C.) | 3C overcharging |
|---|---|---|
| Comparative Example 1 | Ignition (58° C.) | Breakage (max. 462° C.) |
| Comparative Example 2 | No ignition | No breakage (max. 69° C.) |
| Comparative Example 3 | No ignition | No breakage (max. 96° C.) |
| Comparative Example 4 | No ignition | No breakage (max. 63° C.) |
| Comparative Example 5 | No ignition | No breakage (max. 79° C.) |
| Comparative Example 6 | No ignition | No breakage (max. 94° C.) |
| Comparative Example 7 | Ignition (165° C.) | Breakage (max. 378° C.) |
| Comparative Example 8 | No ignition | No breakage (max. 83° C.) |
| Comparative Example 9 | No ignition | No breakage (max. 69° C.) |
| Comparative Example 10 | No ignition | No breakage (max. 78° C.) |
| Comparative Example 11 | No ignition | No breakage (max. 83° C.) |
| Example 3 | No ignition | No breakage (max. 88° C.) |
| Example 4 | No ignition | No breakage (max. 72° C.) |
| Example 5 | No ignition | No breakage (max. 84° C.) |
| Example 6 | No ignition | No breakage (max. 97° C.) |
| Example 7 | No ignition | No breakage (max. 76° C.) |
| Example 8 | No ignition | No breakage (max. 92° C.) |
| Comparative Example 12 | No ignition | No breakage (max. 50° C.) |
| Example 9 | No ignition | No breakage (max. 58° C.) |
| Example 10 | No ignition | No breakage (max. 68° C.) |
| Example 11 | No ignition | No breakage (max. 92° C.) |
| Example 12 | No ignition | No breakage (max. 72° C.) |
| Example 13 | No ignition | No breakage (max. 82° C.) |
| Example 14 | No ignition | No breakage (max. 92° C.) |
| Example 15 | No ignition | No breakage (max. 100° C.) |
| Comparative Example 13 | Ignition (130° C.) | Breakage (max. 510° C.) |
| Example 16 | No ignition | No breakage (max. 92° C.) |
| Example 17 | No ignition | No breakage (max. 120° C.) |
| Comparative Example 14 | Ignition (100° C.) | Breakage (max. 600° C.) |
| Example 18 | No ignition | No breakage (max. 73° C.) |

Table 8 indicates that all electrolytes except for those of Comparative Examples 1, 7, 13, and 14 exhibited no ignition and had good noninflammability. These results are considered to come about because the noninflammable electrolytes included the high-flash point solvent and the fluorine-substituted ether compound without a flash point as main components. But, the cells according to Comparative Examples 1, 7, 13 and 14 ignited at 58° C., 165° C., 130° C., and 100° C., respectively.

The cells according to Examples 3 to 18 and Comparative Examples 2 to 6 and 8 to 12 did not break under the overcharge conditions, and the maximum internal temperature was 110° C. The cells according to Comparative Examples 1, 7, 13, and 14 did break, and the maximum internal temperature was 600° C. It can be concluded from this result that the electrolytes according to Examples 3 to 18 did not heat to the breaking point because of good resistance to oxidation under severe conditions.

In addition, the cell according to Example 18 had greater stability than that of Example 16 with the solution electrolyte, because it used the gel-polymer electrolyte.

It can be seen from the results of Examples 15 to 17 and Comparative Example 14 that an increase in the amount of diethylcarbonate causes ignition of the electrolyte, which results in breakage of the cells. That is, the amount of diethylcarbonate should be about 10%. If the amount of diethylcarbonate is more than 50%, a cell with 20% of fluorine-substituted ether compound without a flash point ignites.

The initial capacity, cycle life characteristic for 100 cycles, and high-temperature storage characteristic at 90° C. for 4 hours were measured. The initial capacity was measured under a condition of a 0.2 C discharge current and 2.75V discharge cut-off.

The cycle life characteristic were measured by repeatedly charging at a 1 C current and charge cut-off of 4.2V for 2.5 hours and discharging at a 1 C current and a discharge cut-off of 2.7V. The value was obtained from a discharge capacity at the 100$^{th}$ cycle compared to the 1$^{st}$ cycle.

The high-temperature storage characteristic was measured by discharging at a 0.2 C current, and a discharge cut-off of 2.75V, and charging at a 0.5 C current and a charge cut-off of 4.2V, for 3 hours. The value was obtained by comparing discharge capacity at the 2$^{nd}$ cycle after maintaining the cell at 90° C. for 4 hours to the discharge capacity at the 1$^{st}$ cycle at room temperature. The results are shown in Table 9.

TABLE 9

| | Cycle life (100 cycles) | High-temperature storage (90° C., 4 h) |
|---|---|---|
| Comparative Example 1 | 95.2% | 92.1% |
| Comparative Example 2 | 45.2% | 92.8% |
| Comparative Example 3 | 53.2% | 85.3% |
| Comparative Example 4 | 47.2% | 89.8% |
| Comparative Example 5 | 51.7% | 92.6% |
| Comparative Example 6 | 64.6% | 86.5% |
| Comparative Example 9 | 63.5% | 86.4% |
| Comparative Example 11 | 59.3% | 94.3% |
| Example 3 | 86.2% | 85.5% |
| Example 4 | 88.3% | 88.9% |
| Example 5 | 87.4% | 91.5% |
| Example 6 | 83.0% | 94.9% |
| Example 7 | 88.5% | 85.4% |
| Example 8 | 84.6% | 89.2% |
| Comparative Example 10 | 39.6% | 91.6% |
| Comparative Example 12 | 42.5% | 90.6% |
| Example 9 | 75.3% | 91.0% |
| Example 10 | 86.7% | 86.1% |
| Example 11 | 88.3% | 88.4% |
| Example 12 | 87.0% | 92.5% |
| Example 13 | 85.5% | 86.3% |
| Example 14 | 89.6% | 94.2% |
| Example 15 | 92.3% | 93.6% |
| Comparative Example 13 | 80.2% | 65.4% |
| Example 16 | 93.5% | 88.7% |
| Example 17 | 90.3% | 89.5% |
| Comparative Example 14 | 85.1% | 86.3% |
| Example 18 | 87.5% | 92.5% |

It can be seen from Table 9 that the cycle life characteristic of the cells according to Examples 3 to 18 had good capacity retention of at least 75%. In other words, the cells according to Comparative Examples 2 to 6 and 9 to 12 had bad cycle life characteristics because they included a large amount of the fluorine-substituted ether compound with a low dielectric constant, which resulted in a decrease in dissolution of lithium ions.

The high-temperature storage characteristic of all cells exhibited a reasonable 80% capacity retention.

Figure 2:
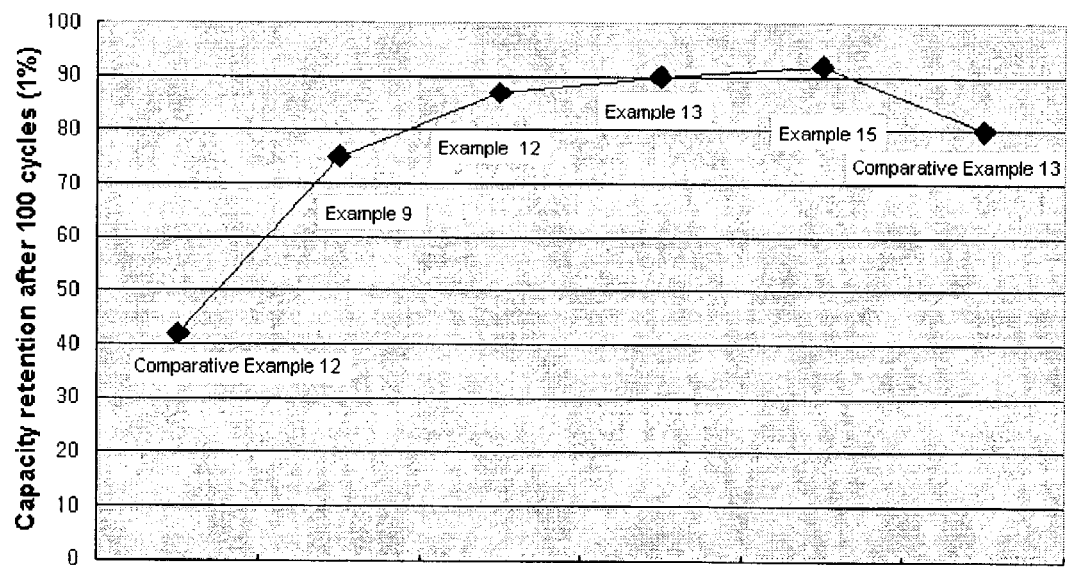
FIG. 2 is a graph showing capacity retention after 100 charge and discharge cycles of the cells according to Examples 9, 12, 13, and 15 of the present invention, and the cells according to Comparative Examples 12 and 13.

In order to identify the battery performances according to the amount of the fluorine-substituted ether compound, the cycle life characteristic (capacity retention after 100 cycles) of the cells according to Comparative Examples 12 to 13, and Examples 9, 12, 13 and 15 were determined and are presented in FIG. 2. It is evident from FIG. 2 that the cells according to Examples 12, 13 and 15 exhibited better cycle life characteristic than that according Comparative Example 13. This result is considered to be due to the fluorine-substituted ether compound decreasing the surface tension of the electrolyte, which results in enhancing affinity between the electrolyte and a polyethethylene/polypropylene separator having a low surface tension.

However, excess fluorine-substituted ether compound has an adverse effect on the battery performance, and it is shown from the results of Comparative Example 12 (excess use) and 13 (no use) that too much fluorine-substituted ether compound deteriorates the cycle life characteristic.

From Tables 4 to 9 and FIG. 2, it can be seen that the inventive electrolyte including 60 to 95 volume % of ethylene carbonate, propylene carbonate or γ-butyrolactone, and 5 to 40 volume % of the fluorine-substituted ether compound exhibits superior ionic conductivity at a low temperature, capacity retention at a low temperature, dissolution, thickness variation at a high temperature, cycle life characteristics, and high-temperature storage characteristics.

While this invention has been described in connection with what are presently considered to be practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An electrolyte for a rechargeable lithium battery, comprising:
   5 to 40 volume % of at least one fluorine-substituted ether compound represented by $R_1$—O—$R_2$, wherein $R_1$ and $R_2$ are each independently an alkyl group substituted with fluorine, having a substitution ratio of hydrogen with fluorine of 57 to 86%, a total viscosity of 0.9 to 2.3 cp, and a boiling point of at least 88° C.;
   60 to 90 volume % of a non-aqueous organic solvent having a flash point of at least 80° C.; and,
   a compatibilizer selected from the group consisting of compounds represented by formulas 11 to 12:

$CH_3COOCH_2(CF_2)_3CF_2H$ and (11)

$CH_3COOCH_2CF_2CF_2H$ (12).

2. The electrolyte of claim 1, wherein the fluorine-substituted ether compound is at least one selected from the group consisting of compounds represented by formulas 1 to 8:

$HCF_2(CF_2)_3CH_2OCF_2CF_2H$ (1)

$CF_3CF_2CH_2OCF_2CFHCF_3$ (2)

$HCF_2CF_2CH_2OCF_2CF_2H$ (3)

$HCF_2CF_2CH_2OCF_2CFHCF_3$ (4)

$HCF_2(CF_2)_3CH_2OCF_2CFHCF_3$ (5)

$HCF_2CF_2OCH_2CF_3$ (6)

$CF_3CF_2CH_2OCF_2CF_2H$ and (7)

$HCF_2CF_2CH_2OCF_2H$ (8).

3. The electrolyte of claim 1, wherein the non-aqueous organic solvent is comprises at least one solvent selected from cyclic esters and cyclic carbonates.

4. The electrolyte of claim 1, wherein the non-aqueous organic solvent is at least one selected from the group consisting of γ-butyrolactone, decanolide, valerolactone, mevalonolactone, ethylene carbonate, fluoroethylene carbonate, chloroethylene carbonate, propylene carbonate, chloromethylethylene carbonate, and fluoromethylethylene carbonate.

5. The electrolyte of claim 1, wherein the compatibilizer is present in an amount of 0.01 to 10 wt % based on the total weight of the electrolyte.

6. An electrolyte for a rechargeable lithium battery, comprising:
   5 to 40 volume % of at least one fluorine-substituted ether compound represented by $R_1$—O—$R_2$, wherein $R_1$ and $R_2$ are each independently an alkyl group substituted with fluorine, having a substitution ratio of hydrogen with fluorine of 57 to 86%, a viscosity of 0.9 to 2.3 cp and a boiling point of at least 88° C.;
   20 volume % to 95 volume % of a high-flash point non-aqueous organic solvent having a flash point of at least 80° C.;
   a positive amount up to 40 volume % of a low-viscosity non-aqueous organic solvent having a viscosity of 0.2 to 1.8 cP; and
   a compatibilizer selected from the group consisting of compounds represented by formulas 11 to 12:

$CH_3COOCH_2(CF_2)_3CF_2H$ and (11)

$CH_3COOCH_2CF_2CF_2H$ (12).

7. The electrolyte of claim 6, wherein the fluorine-substituted ether compound is at least one selected from the group consisting of compounds represented by formulas 1 to 8:

$HCF_2(CF_2)_3CH_2OCF_2CF_2H$ (1)

$CF_3CF_2CH_2OCF_2CFHCF_3$ (2)

$HCF_2CF_2CH_2OCF_2CF_2H$ (3)

$HCF_2CF_2CH_2OCF_2CFHCF_3$ (4)

$HCF_2(CF_2)_3CH_2OCF_2CFHCF_3$ (5)

$HCF_2CF_2OCH_2CF_3$ (6)

$CF_3CF_2CH_2OCF_2CF_2H$ and (7)

$HCF_2CF_2CH_2OCF_2H$ (8).

8. The electrolyte of claim 6, wherein the high-flash point non-aqueous organic solvent is at least one solvent selected from cyclic esters and cyclic carbonates.

9. The electrolyte of claim 6, wherein the high-flash point non-aqueous organic solvent is at least one selected from the group consisting of γ-butyrolactone, decanolide, valerolactone, mevalonolactone, ethylene carbonate, fluoroethylene carbonate, chloroethylene carbonate, propylene carbonate, chloromethylethylene carbonate, and fluoromethylethylene carbonate.

10. The electrolyte of claim 6, wherein the low-viscosity non-aqueous organic solvent comprises one or more chain carbonates.

11. The electrolyte of claim 6, wherein the low-viscosity non-aqueous organic solvent is at least one selected from the group consisting of diethyl carbonate, ethyl methyl carbonate, dimethyl carbonate, ethylpropyl carbonate, and ethylbutyl carbonate.

12. The electrolyte of claim 6, wherein the compatibilizer is present in an amount of 0.01 to 10 wt % based on the total weight of the electrolyte.

13. A rechargeable lithium battery comprising:
   an non-aqueous electrolyte comprising 5 to 40 volume % of at least one fluorine-substituted ether compound represented by $R_1$—O—$R_2$, wherein $R_1$ and $R_2$ are each independently an alkyl group substituted with fluorine, having a substitution ratio of hydrogen with fluorine of 57 to 86%, a viscosity of 0.9 to 2.3 cp, and a boiling point of at least 88° C.; and 60 to 90 volume % of a non-aqueous organic solvent having a flash point of at least 80° C.;

a positive electrode comprising a positive active material in which lithium intercalation reversibly occurs;

a negative electrode comprising a negative active material in which lithium intercalation reversibly occurs; and a compatibilizer selected from the group consisting of compounds represented by formulas 11 to 12:

$$CH_3COOCH_2(CF_2)_3CF_2H \text{ and} \tag{11}$$

$$CH_3COOCH_2CF_2CF_2H \tag{12}$$

14. The rechargeable lithium battery of claim 13, wherein the fluorine-substituted ether compound is at least one selected from the group consisting of compounds represented by formulas 1 to 8:

$$HCF_2(CF_2)_3CH_2OCF_2CF_2H \tag{1}$$

$$CF_3CF_2CH_2OCF_2CFHCF_3 \tag{2}$$

$$HCF_2CF_2CH_2OCF_2CF_2H \tag{3}$$

$$HCF_2CF_2CH_2OCF_2CFHCF_3 \tag{4}$$

$$HCF_2(CF_2)_3CH_2OCF_2CFHCF_3 \tag{5}$$

$$HCF_2CF_2OCH_2CF_3 \tag{6}$$

$$CF_3CF_2CH_2OCF_2CF_2H \text{ and} \tag{7}$$

$$HCF_2CF_2CH_2OCF_2H \tag{8}$$

15. The rechargeable lithium battery of claim 13, wherein the non-aqueous organic solvent is at least one solvent selected from cyclic esters and cyclic carbonates.

16. The rechargeable lithium battery of claim 15, wherein the non-aqueous organic solvent is at least one selected from the group consisting of γ-butyrolactone, decanolide, valerolactone, mevalonolactone, ethylene carbonate, fluoroethylene carbonate, chloroethylene carbonate, propylene carbonate, chloromethylethylene carbonate, and fluoromethylethylene carbonate.

17. The rechargeable lithium battery of claim 13, wherein the compatibilizer is present in an amount of 0.01 to 10 wt % based on the total weight of the electrolyte.

18. The rechargeable lithium battery of claim 15, wherein the battery is a lithium ion battery or a lithium polymer battery.

19. A rechargeable lithium battery comprising:

an electrolyte comprising 5 to 40 volume % of at least one fluorine-substituted ether compound represented by $R_1$—O—$R_2$, wherein $R_1$ and $R_2$ are each independently an alkyl group substituted with fluorine, having a substitution ratio of hydrogen with fluorine of 57 to 86%, a viscosity of 0.9 to 2.3 cp, and a boiling point of at least 88° C.; 20 volume % to 95 volume % of a high-flash point non-aqueous organic solvent having a flash point of at least 80° C.; a positive amount up to 40 volume % of a low-viscosity non-aqueous organic solvent having a viscosity of 0.2 to 1.8 cP;

a positive electrode comprising a positive active material in which lithium intercalation reversibly occurs; and a negative electrode comprising a negative active material in which lithium intercalation reversibly occurs; and a compatibilizer selected from the group consisting of compounds represented by formulas 11 to 12:

$$CH_3COOCH_2(CF_2)_3CF_2H \text{ and} \tag{11}$$

$$CH_3COOCH_2CF_2CF_2H \tag{12}$$

20. The rechargeable lithium battery of claim 19, wherein the organic fluoride ether compound is at least one selected from the group consisting of compounds represented by formulas 1 to 8:

$$HCF_2(CF_2)_3CH_2OCF_2CF_2H \tag{1}$$

$$CF_3CF_2CH_2OCF_2CFHCF_3 \tag{2}$$

$$HCF_2CF_2CH_2OCF_2CF_2H \tag{3}$$

$$HCF_2CF_2CH_2OCF_2CFHCF_3 \tag{4}$$

$$HCF_2(CF_2)_3CH_2OCF_2CFHCF_3 \tag{5}$$

$$HCF_2CF_2OCH_2CF_3 \tag{6}$$

$$CF_3CF_2CH_2OCF_2CF_2H \text{ and} \tag{7}$$

$$HCF_2CF_2CH_2OCF_2H \tag{8}$$

21. The rechargeable lithium battery of claim 19, wherein the high-flash point non-aqueous organic solvent is at least one solvent selected from cyclic esters and cyclic carbonates.

22. The rechargeable lithium battery of claim 21, wherein the high-flash point non-aqueous organic solvent is at least one selected from the group consisting of γ-butyrolactone, decanolide, valerolactone, mevalonolactone, ethylene carbonate, fluoroethylene carbonate, chloroethylene carbonate, propylene carbonate, chloromethylethylene carbonate, and fluoromethylethylene carbonate.

23. The rechargeable lithium battery of claim 19, wherein the low-viscosity non-aqueous organic solvent comprises one or more chain carbonates.

24. The rechargeable lithium battery of claim 19, wherein the low-viscosity non-aqueous organic solvent is selected from the group consisting of diethyl carbonate, ethyl methyl carbonate, dimethyl carbonate, ethylpropyl carbonate, and ethylbutyl carbonate.

25. The rechargeable lithium battery of claim 19, wherein the compatibilizer is present in an amount of 0.01 to 10 wt % based on the total weight of the electrolyte.

26. The rechargeable lithium battery of claim 19, wherein the battery is a lithium ion battery or a lithium polymer battery.

* * * * *

UNITED STATES PATENT AND TRADEMARK OFFICE
CERTIFICATE OF CORRECTION

PATENT NO. : 7,229,718 B2  Page 1 of 1
APPLICATION NO. : 10/440220
DATED : June 12, 2007
INVENTOR(S) : Yamaguchi et al.

It is certified that error appears in the above-identified patent and that said Letters Patent is hereby corrected as shown below:

In the Claims

Column 19, line 61, Claim 3     Delete "is"

Column 21, line 47, Claim 18    Delete "claim 15",
                                Insert --claim 13--

Signed and Sealed this

Sixth Day of May, 2008

JON W. DUDAS
*Director of the United States Patent and Trademark Office*